Oct. 13, 1970  W. KREIS ET AL  3,533,142
CLAMPING DEVICE
Filed Sept. 30, 1968  2 Sheets-Sheet 2
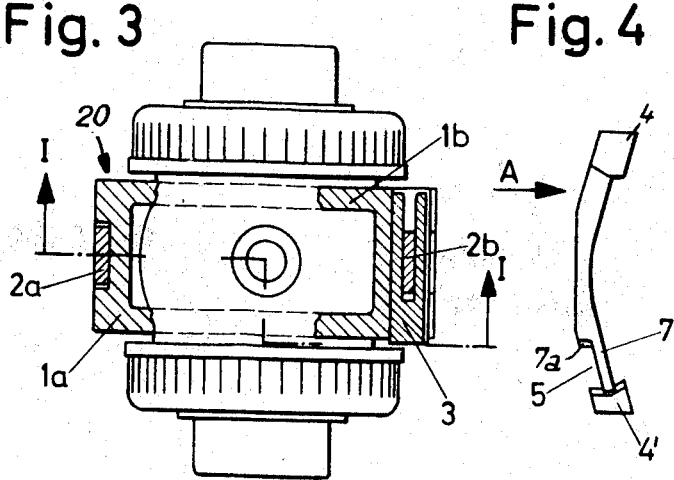
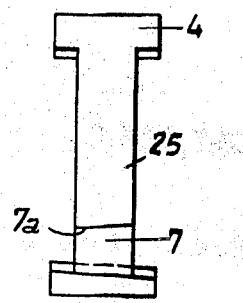
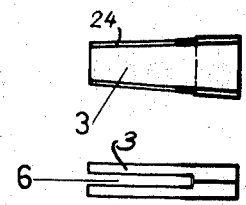
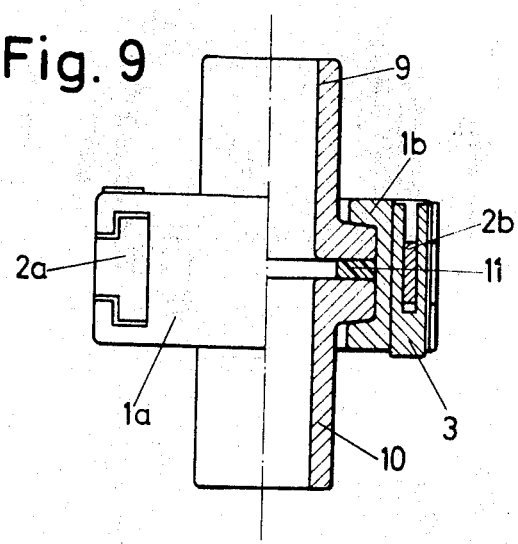
INVENTORS
WALTER KREIS & PAUL TROSCH
BY Jacobi & Davidson
ATTORNEYS.

United States Patent Office 3,533,142
Patented Oct. 13, 1970

---

3,533,142
CLAMPING DEVICE
Walter Kreis, Neuhausen af Rheinfall, and Paul Trosch, Schaffhausen, Switzerland, assignors to Georg Fischer Aktiengesellschaft, Schaffhausen, Switzerland, a corporation of Switzerland
Filed Sept. 30, 1968, Ser. No. 763,601
Claims priority, application Switzerland, Oct. 3, 1967, 13,788/67
Int. Cl. A41b *21/00;* F16l *3/08*
U.S. Cl. 24—263                                    15 Claims

ABSTRACT OF THE DISCLOSURE

There is disclosed a clamping device formed of plastic capable of being mounted upon at least one substantially pipe-shaped element. This clamping device comprises at least two clamping elements positionable at the pipe-shaped element, and at least two connecting bracket means for retaining together said clamping elements. The connecting bracket means act in a plane which is at least approximately perpendicular to the enclosed pipe axis. Each connecting bracket means is suspended in one clamping element and can be clamped or tightened at a neighboring clamping element by means of a clamping wedge member which extends at least approximately parallel to the enclosed pipe axis and is of substantially conical construction in the clamping direction.

BACKGROUND OF THE INVENTION

The present invention relates to an improved clamping device or mechanism formed of plastic which is capable of being arranged upon at least one substantially pipe-shaped element, and such invention concerns itself further with an improved use of the aforementioned inventive clamping device.

Oftentimes the desire or requirement exists in practice to actuate a plastic valve unit constructed for manual operation either electrically, hydraulically or pneumatically by means of an adjustment motor or the like. Since such valve units generally are not constructed in such a fashion that such a motor can be attached thereto, any attachment of the positioning or adjustment motor in operable association with the valve unit can only usually be carried out in an extremely complicated manner since no threading can be cut in the existing valve housing.

SUMMARY OF THE INVENTION

Accordingly, it is a primary object of the present invention to provide an improved clamping device of the type described which is relatively simple in construction, extremely economical to manufacture, easy to use, and readily capable of carrying out its intended function.

Another, more specific object of the present invention is directed to the provision of an improved clamping device capable of being arranged at at least one substantially pipe-shaped element, for instance, serving the purpose of attaching an adjustment motor to a ball valve unit constructed without any attachment mechanism, and wherein said clamping device can be simply mounted and dismantled without the use of tools, without, for instance, having to dismantle an already mounted valve unit, and further, where the connecting elements required for perfecting the mounting operation are likewise formed of plastic and constructed in such a fashion that with a minimum spatial requirement they possess as large as possible tensile strength in the lateral direction of the clamping device.

Still a further significant object of the present invention aims at providing a clamping device of the mentioned type which can be fabricated at relatively low cost, installed and dismantled with extreme ease and by relatively unskilled personnel, while readily serving to reliably attach together two given elements, such as two pipes, or a desired component, such as an adjustment motor or the like to a pipe-like element.

Now, in order to implement these and still further objects of the invention which will become more readily apparent as the description proceeds, the inventive clamping device which is formed of plastic is generally manifested by the features that it incorporates at least two clamping elements. These clamping elements are advantageously retained together in cooperable clamping relationship by means of at least two connecting brackets which act in a plane which is at least approximately perpendicular to the enclosed pipe axis. Each of the clamping brackets is constructed in such a way that it can be suspended in one of the clamping elements and can be locked at a neighboring clamping element by means of a wedge member which extends at least approximately parallel to the enclosed pipe axis and which is constructed to be conical in the clamping direction.

The inventive clamping device can be, for instance, advantageously also employed for attaching one pipe or the like to a wall or for connecting two pipe ends each equipped with a respective collar or equivalent structure.

BRIEF DESCRIPTION OF THE DRAWINGS

The invention will be better understood, and objects other than those set forth above, will become apparent, when consideration is given to the following detailed description thereof. Such description makes reference to the annexed drawings wherein:

FIG. 3 is a sectional view taken along the line III—III of FIG. 1;

FIG. 4 is a side view of a connecting bracket used in the clamping device shown in the arrangement depicted in FIGS. 1 to 3;

FIG. 5 is a front view of the clamping bracket of FIG. 4 as viewed in the direction of the arrow A;

FIG. 6 is an end view of the clamping wedge member used in the clamping device of the arrangement shown in FIGS. 1 to 3;

FIG. 7 is a side view of the clamping wedge member shown in FIG. 6;

FIG. 8 is a plan view of the clamping wedge member depicted in FIGS. 6 and 7; and FIG. 9 is a fragmentary sectional view showing the arrangement of the inventive clamping device as employed for connecting together two pipe ends.

DESCRIPTION OF THE PREFERRED EMBODIMENTS

Figure 1:
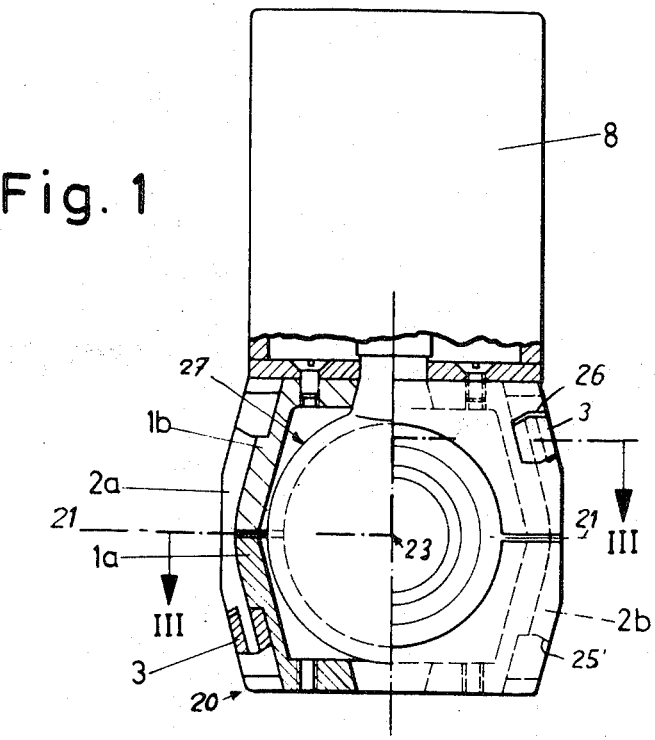
FIG. 1 is a fragmentary sectional view of an embodiment of inventive clamping device equipped with a ball valve unit, taken along the line I—I of FIG. 3.
Figure 2:
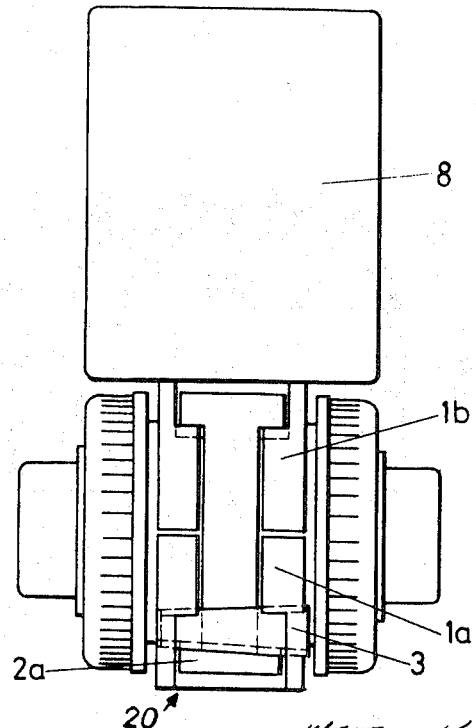
FIG. 2 is a side view of the arrangement depicted in FIG. 1.

Describing now the drawings, the exemplary embodiment of inventive clamping device, generally designated by reference numeral 20, as depicted in FIGS. 1 to 3 inclusive, completely consists of plastic, therefore is not subject to corrosion effects. This clamping device 20 embodies two identical clamping elements 1a and 1b which are rotated or turned 180° in relation to one another with respect to their parting plane indicated by the line 21—21 in FIG. 1. Moreover, these two clamping elements 1a and 1b are detachably retained together by means of two connecting brackets 2a and 2b which act in a plane which is substantially perpendicular to the enclosed pipe axis 23 schematically indicated in FIG. 1. Each of both connecting brackets 2a and 2b is constructed in such a way that it can be suspended in one of the clamping elements 1a or 1b, respectively, and can be locked in the other neighboring clamping element 1b or 1a, respectively, by means of an associated clamping wedge member 3 which extends at least approximately parallel to the enclosed pipe axis, as best shown for instance in FIGS. 1 to 3 inclusive. Furthermore, each such clamping wedge member 3 is constructed to possess a conical configuration in the clamping direction, as best recognized by referring to FIG. 7 showing the tapered conical wall portion 24 of a given clamping wedge member 3.

As best recognized by referring to FIGS. 4 and 5, each of the connecting brackets 2a and 2b are constructed to possess a substantially T-shaped configuration. Each such connecting bracket includes a central body portion 25 and at one end a transverse extending portion or cross-beam 4 and at the opposite end, as also viewed from the side in FIG. 4, a substantially prismatic T-shaped transverse portion 4' constructed as will be explained shortly to receive an associated clamping wedge member. More precisely, it will be recognized that the substantially prismatic T-shaped end portion 4', which is opposite the other transverse extending portion 4 of each connecting bracket 2a and 2b, is provided with a groove 5, for instance also of substantially appropriate prismatic shape, which serves to receive the wedge member 3. Continuing, it will be recognized that each such wedge member 3 is provided with a substantially slit-shaped opening 6 so that it can be pushed in its lengthwise direction in straddling fashion over a web portion 7 of the associated connecting bracket 1a or 1b.

Additionally, it is mentioned that the grooves 5 provided at the clamping elements 1a and 1b and serving for the reception of the associated clamping wedge member 3 are each constructed so that the walls 7a thereof at the portion of each such groove directed radially towards the outside narrow in a direction away from the enclosed pipe axis. As a result, there is rendered impossible any dropping out of the associated wedge member 3 in its transverse direction. In order to attach each connecting bracket 2a and 2b to the associated clamping elements 1a and 1b, it is only necessary to suspend the end portion 4 in an appropriately shaped recess 25' of one of the clamping elements, then to pivot the other end 4' into operable association with a corresponding shaped, for instance prismatic shaped recess 26 at the other clamping element, whereby the thus mounted connecting bracket is flush with the outer contour or surface of the connecting elements 2a, 2b, and then to insert the clamping wedge member into the receiving groove 5.

The clamping device 20 depicted in FIGS. 1 to 3 is there shown arranged upon a conventionally constructed ball valve unit, generally indicated by reference character 27 in FIG. 1, and serves for the atachment of an adjusting or positioning motor unit 8 capable of actuating the valve unit without the latter having to be bored or in any other way machined. Naturally, the component can be also constructed in such a way that it extends completely in front of or behind the connecting bracket in a groove of the latter.

By virtue of the use of connecting bracket means it is possible to avoid the unfavorable form of screws when using plastic. Furthermore, during mounting and dismantling of the inventive clamping device neither a screwdriver nor a screw-socket wrench are required.

The previously described physical construction of inventive clamping device renders possible the attachment, erection and assembly of pipe conduit elements at flat and prismatic structural elements such as, for instance switchboards or panels. In so doing, it is possible to pass the braced or mounted fittings through the plate and, for instance, to mount the handgrip at the front side. Additionally, it is also readily possible with the aid of the clamping device to attach a series of fittings which are threaded from the rear to the front side of a plate. A further field of application resides in arranging the clamping devices in a number of stories or in stacked fashion above one another or next to one another and to use these elements in building-block like fashion as mounting blocks.

Plastic fittings or the like are preferably constructed to possess a central-symmetrical, arched-shape for reasons of material flow, uniform material distribution and notch effect. Prismatic shapes result in considerably greater material accumulations. The clamping device renders possible a simultaneous ideal form or configuration for the fittings or armatures and an attachment at prismatic clamping surfaces.

In FIG. 9 there is shown the arrangement of the inventive clamping device for connecting two pipe ends 9 and 10. Between the end faces of both pipe ends 9 and 10 there is arranged a sealing ring 11, for instance, an O-ring or a flat sealing member, and wherein the pressing pressure or force between the end faces is determined by the position of both wedge members 3 in the associated grooves 5.

It should be apparent from the foregoing detailed description, that the objects set forth at the outset to the specification have been successfully achieved.

Accordingly, what is claimed is:

1. A clamping device formed of plastic capable of being mounted upon at least one substantially pipe-shaped element, comprising at least two clamping elements positionable at the pipe-shaped element, at least two connecting bracket means for retaining together said clamping elements, said connecting bracket means acting in a plane which is at least approximately perpendicular to the enclosed pipe axis, each connecting bracket means being suspended in one clamping element and being fastened at a neighboring clamping element by means of a wedge member extending at least approximately parallel to the enclosed pipe axis, said wedge member possessing a substantially conical construction in the clamping direction.

2. A clamping device as defined in claim 1, wherein said at least two clamping elements are of identical construction and operably connected with one another by said connecting bracket means in such a fashion that one clamping element is rotated through substantially 180° with respect to the parting plane between said clamping elements.

3. A clamping device as defined in claim 1, wherein each connecting bracket means has its end cooperating with the wedge member constructed to provide a substantially T-shaped configuration as viewed in the direction of the pipe axis.

4. A clamping device as defined in claim 3, wherein said substantially T-shaped configured end includes a transverse portion which is of substantially prismatic shape.

5. A clamping device as defined in claim 4, wherein each clamping element is provided with a substantially prismatic-shaped recess for receiving the substantially prismatic-shaped transverse portion of said substantially T-shaped end.

6. A clamping device as defined in claim 1, wherein said wedge member is provided with a substantially slit-shaped opening, each connecting bracket means having a portion over which said wedge member with its slit-shaped opening may be displaced.

7. A clamping device as defined in claim 1, wherein said clamping elements and said connecting bracket means incorporate means for receiving each associated wedge member, and wherein said wedge member and said receiving means of said clamping elements and said connecting bracket means are of substantially prismatic-shape.

8. A clamping device as defined in claim 1, wherein each clamping element is provided with groove means for receiving an associated wedge member, said groove means being at least partially constructed to narrow in radial direction towards the outside and away from the enclosed pipe axis.

9. A clamping element as defined in claim 1, wherein each connecting bracket means is provided at least at one end, viewed in a direction perpendicular to the pipe axis, so as to possess a substantially T-shaped configuration.

10. A clamping device as defined in claim 9, wherein each of said connecting bracket means is of substantially T-shaped configuration and includes a transverse portion, the portion of each connecting bracket means located remote from said transverse portion being provided with a receiving groove means for the wedge member.

11. A clamping device as defined in claim 1, wherein each connecting bracket means is constructed and arranged in such a manner that upon removing the associated wedge member it can be pivoted away from said clamping elements, and each such connecting bracket means can be flushly locked and by the associated wedge with the outer contour of the clamping elements.

12. A clamping device as defined in claim 1, further including valve means, said clamping elements being arranged in cooperable association with said valve means.

13. A clamping device as defined in claim 1, further including an adjustment motor capable of operating a flow regulating device, said clamping device serving to secure said adjustment motor in operable association with said flow regulating device.

14. A clamping device as defined in claim 1, wherein said flow regulating device comprises valve means.

15. A clamping device as defined in claim 1, which serves for the building-block like assembly of rotational-symmetrical pipe conduit elements with prismatic fixture elements.

References Cited

UNITED STATES PATENTS 3,295,806  1/1967  Modeme _____ 248—74

FOREIGN PATENTS 951,786  10/1956  Germany.
1,101,876  3/1961  Germany.

J. KARL BELL, Primary Examiner

U.S. Cl. X.R.

248—74